(12) United States Patent
Lu et al.

(10) Patent No.: US 7,926,955 B2
(45) Date of Patent: Apr. 19, 2011

(54) COLOR WHEEL MODULE AND OPTICAL ENGINE COMPRISING THE SAME

(75) Inventors: Chang-Hsing Lu, Taoyuan Hsien (TW); Ming-Chung Chang, Taoyuan Hsien (TW)

(73) Assignee: Delta Electronics, Inc., Taoyuan County (TW)

(*) Notice: Subject to any disclaimer, the term of this patent is extended or adjusted under 35 U.S.C. 154(b) by 822 days.

(21) Appl. No.: 11/767,248

(22) Filed: Jun. 22, 2007

(65) Prior Publication Data

US 2008/0074626 A1   Mar. 27, 2008

(30) Foreign Application Priority Data

Sep. 22, 2006  (TW) ................................ 95135185 A

(51) Int. Cl.
*G03B 21/14*    (2006.01)
(52) U.S. Cl. ............. 353/84; 353/31; 348/743; 359/892
(58) Field of Classification Search .................... 353/84, 353/31, 20, 77; 348/742, 743; 359/891, 359/892
See application file for complete search history.

(56) References Cited

U.S. PATENT DOCUMENTS

| 6,971,752 | B2 * | 12/2005 | Lee ................................ 353/84 |
| 6,994,439 | B2 | 2/2006 | Basey |
| 6,999,252 | B2 * | 2/2006 | Lee et al. ...................... 359/892 |
| 2003/0214740 | A1 | 11/2003 | Wong et al. |

FOREIGN PATENT DOCUMENTS

TW           M244480         9/2004

* cited by examiner

*Primary Examiner* — Thanh X Luu
*Assistant Examiner* — Francis M Legasse, Jr.
(74) *Attorney, Agent, or Firm* — Patterson Thuente Christensen Pedersen, P.A.

(57) ABSTRACT

A color wheel module and an optical engine comprising the same are disclosed. The optical engine comprises a frame and a color wheel module, wherein the color wheel module comprises a color wheel, a connecting device, and a supporting chassis. The color wheel connects to the supporting chassis. The supporting chassis comprises a first fixing base and a second fixing base, wherein the connecting device connects the first fixing base and the second fixing base to the frame. In view of the center of the color wheel, the first fixing base is disposed opposite to or at an angle with the second fixing base.

16 Claims, 4 Drawing Sheets

COLOR WHEEL MODULE AND OPTICAL ENGINE COMPRISING THE SAME

This application claims priority to Taiwan Patent Application No. 095135185 filed on Sep. 22, 2006, the disclosures of which are incorporated herein by reference in their entirety.

CROSS-REFERENCES TO RELATED APPLICATIONS

Not applicable.

BACKGROUND OF THE INVENTION

1. Field of the Invention

The subject invention relates to a color wheel module for use in an optical engine and the optical engine comprising the color wheel module. More specifically, the subject invention relates to a module design for stabilizing the color wheel module in the optical engine.

2. Descriptions of the Related Art

Digital light processing (DLP) technology has been adopted in digital projection devices to generate digital images. The technology has been developed mainly by utilizing micro electro mechanical systems (MEMS), such as digital micromirror devices (DMD), as a basis for cooperation with other peripheral optical devices. FIG. 1 illustrates the main components of a prior DLP projection device 100. The DLP projection device 100 comprises a light source 102, a color wheel 104, a light tunnel 106, a lens assembly 108, a DMD 110, a projection lens 112, and so forth. In relation to the proceeding light direction, the projection device 100 can be divided into two major sub-systems: the illumination system, which includes the light source 102, the color wheel 104, the light tunnel 106, and the lens assembly 108; and the image system, which includes the DMD 110 and the projection lens 112.

The light projected from the light source 102 is separated into red, blue, and green colors via the color wheel 104, and then, sent into the light tunnel 106 for color combination. After light separation and combination via the lens assembly 108, the light enters into the DMD 110 and the image input signals are received by the DMD 110 so that the micromirrors (not shown) thereon will rotate to project the correct light and images onto the lens 112. Finally, the images can be displayed on a screen (not shown) via the lens 112. Compared with other optical engines, the DLP projection has high brightness quality, contrast, and lightness.

In the prior DLP projection devices, the components other than the light source 102 and the lens 112 are usually integrated into an optical engine (not shown) to meet the module requirement of the whole mechanism. Moreover, the color wheel 104 usually combines with a fixing base (not shown) to form a color wheel module. Accordingly, the color wheel can separate the light on the light path in the optical engine by fastening the fixing base on the frame. The fixing base is fastened to one end of the fixing base on the main body of the frame with at least one fixing mechanism, while the color wheel 104 rotates with a high speed actuated by a motor with a revolution speed per minute (RPM) ranging from several thousand RPMs to tens of thousands RPMs. With a high RPM, the single-direction fastening mechanism adopted by the prior color wheel will result in noises and vibrations in the DLP projection device.

Thus, in order to effectively suppress the noise and the vibration of the DLP projection device when the color wheel operates with the same structure and under certain costs, it is essential to improve the above-mentioned structure of the color wheel module so that the DLP projection device can keep silent and stable after a long term operation of the color wheel.

SUMMARY OF THE INVENTION

An objective of the subject invention is to provide a color wheel module for use in an optical engine which comprises a frame and the color wheel module. The color wheel module comprises a color wheel, a connecting device and a supporting chassis. The color wheel connects to the supporting chassis. The supporting chassis has a first fixing base and a second fixing base. The connecting device connects the first fixing base and the second fixing base to the frame, wherein the first fixing base is substantially disposed opposite to or oppositely deviated from a certain angle with the second fixing base in view of the center of the color wheel. Therefore, the color wheel module can provide at least two fastening directions on the frame to effectively promote the stability while the color wheel rotates and suppress the noise and the vibration between the color wheel module and the frame without any damages of the components owing to the vibration.

Another objective of the subject invention is to provide an optical engine, which comprises a frame and a color wheel module, as mentioned above, configured on the frame. The color wheel module can be fastened more stably onto the frame so that the instability due to the noise and the vibration between the color wheel module and the frame can be suppressed effectively and the quality of the images can be improved.

The detailed technology and preferred embodiments implemented for the subject invention are described in the following paragraphs accompanying the appended figures for people skilled in this field to well appreciate the features of the claimed invention.

DESCRIPTION OF THE PREFERRED EMBODIMENT

The characteristics of the subject invention emphasize the technology of fastening the color wheel module. Accordingly, the following disclosure only relates to the color wheel module and the peripheral components thereof in the optical engine. The other components that are not directly related to the color wheel module are neglected.

Figure 1:
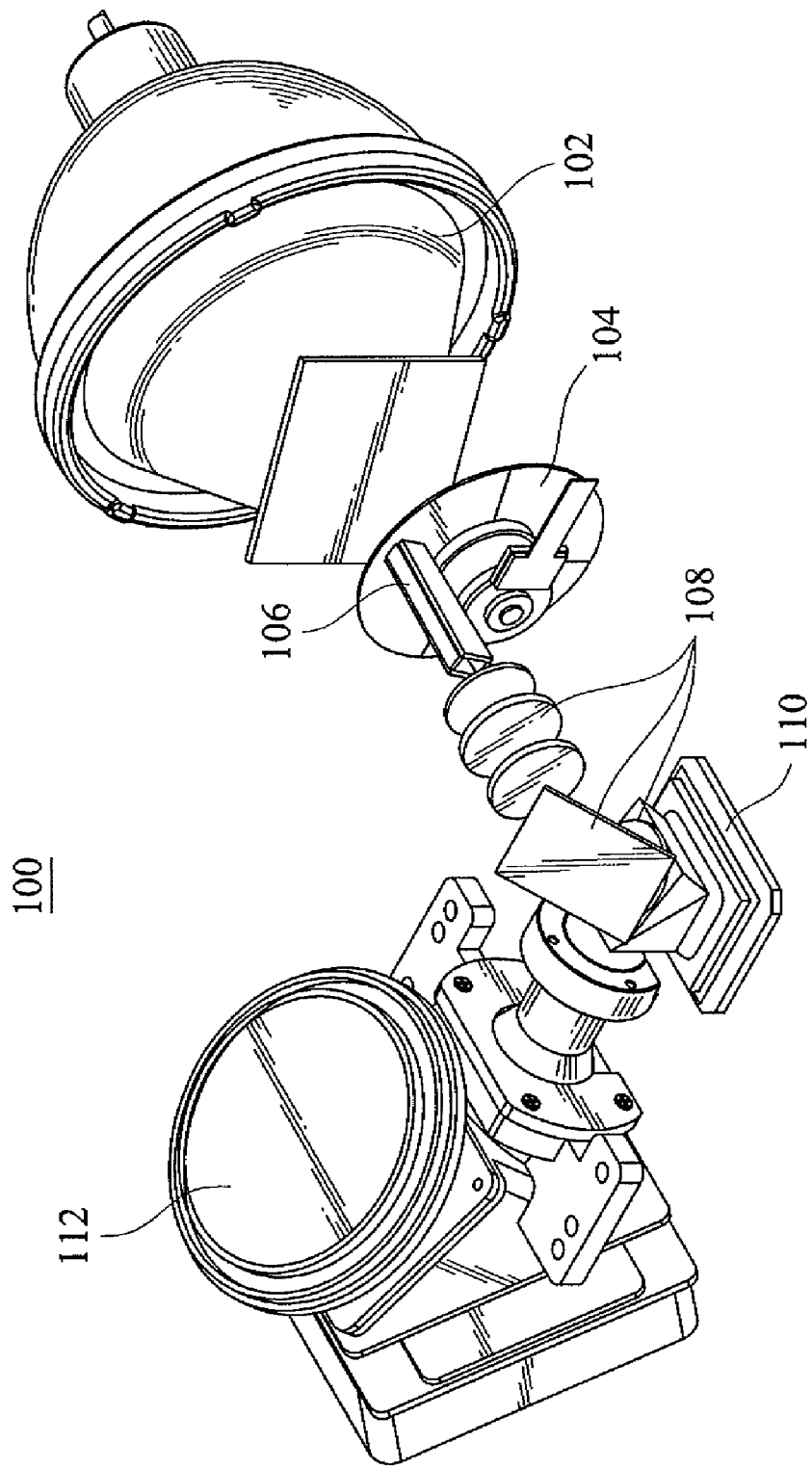
FIG. 1 depicts an exploded schematic drawing of the main components of a prior DLP projection device.
Figure 2:
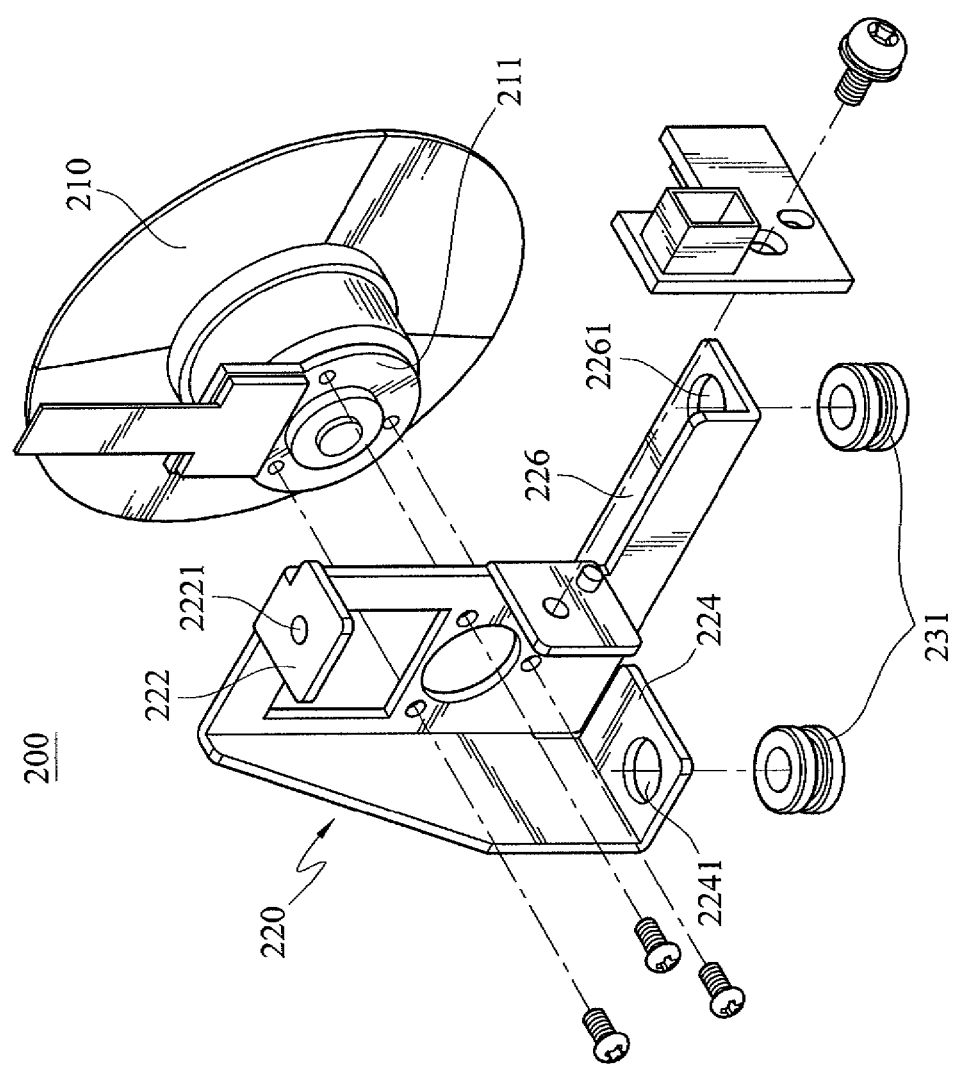
FIG. 2 depicts an exploded schematic drawing of an embodiment of a color wheel module of the subject invention.
Figure 3:
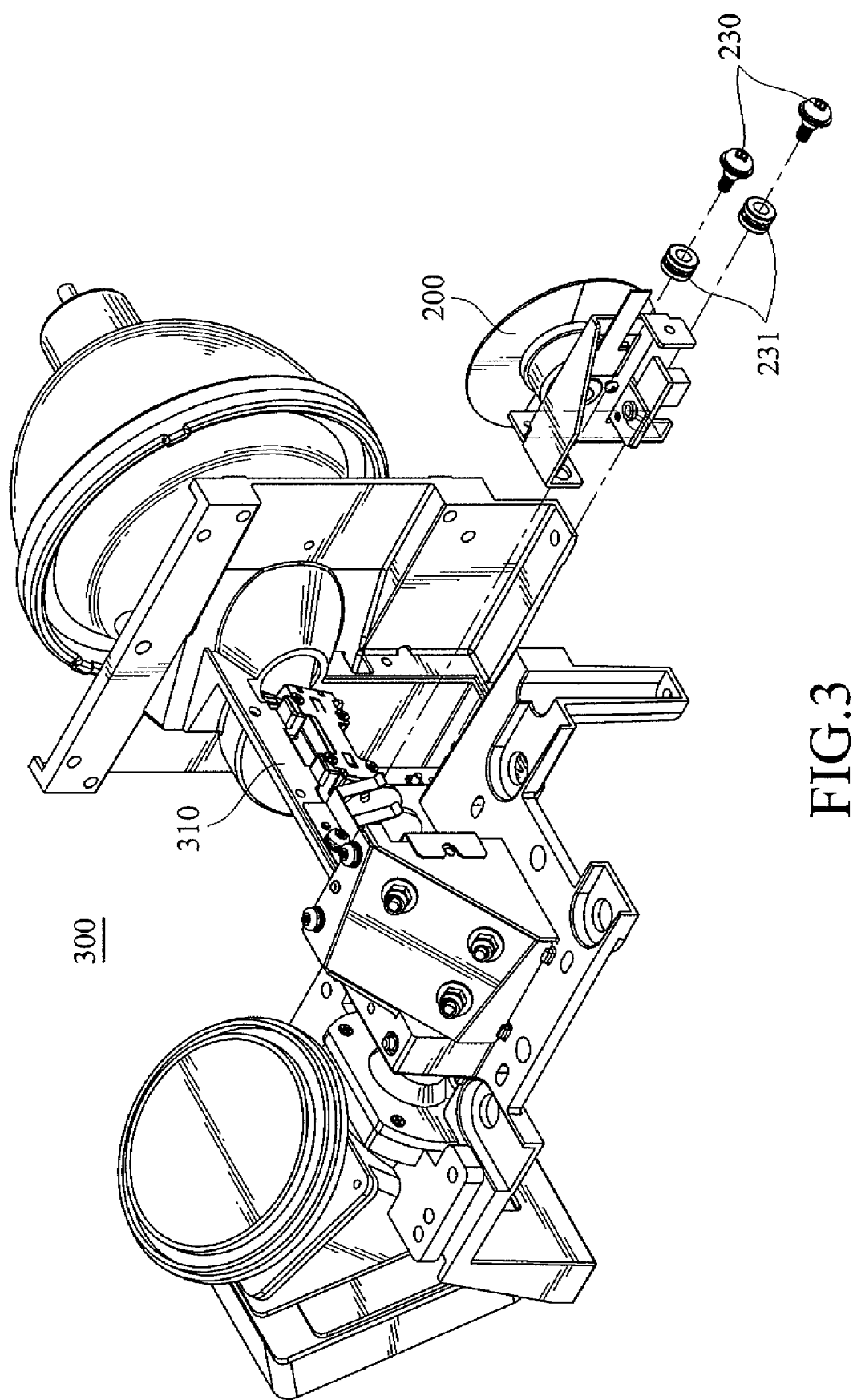
FIG. 3 depicts a schematic drawing before combining a color wheel module in FIG. 2 with a frame.

FIG. 2 illustrates an embodiment of a color wheel module 200 of the subject invention, while FIG. 3 illustrates the combination of the color wheel module 200 with an optical engine base 300 both configured inside the optical engine. In a preferred embodiment, the optical engine comprises the color wheel module 200 and the frame 300, wherein the color wheel module 200 comprises a color wheel 210, a connecting device and a supporting chassis 220. The color wheel 210 connects to the supporting chassis 220 to form the main structure of the color wheel module. Next, the supporting chassis 220 comprises a first fixing base 222 and a second fixing base 224. The connecting device connects the first fixing base 222 and the second fixing base 224 to the frame 300.

In a preferred embodiment, the first fixing base 222 is substantially disposed opposite to the second fixing base 224 in view of the center 211 of the color wheel 210 (i.e. the first fixing base 222, the center 211 of the color wheel 210 and the second fixing base 224 are disposed linearly), as shown in FIG. 2. Specifically, the first fixing base 222 of the supporting chassis 220 comprises a first opening 2221 while the second fixing base 224 comprises another opening 2241 for receiving the connecting device (the type of connecting device is disclosed later). The connecting device is then able to fasten the supporting chassis 220 onto the frame 300. Because the first fixing base 222 and the second fixing base 224 are now opposite of each other, the supporting chassis 220 can be fastened with two opposite directions. Accordingly, when the color wheel 210 rotates around the center 211 with a high speed, the stability between the color wheel module and the frame 300 can be enhanced, thereby, suppressing the noises and the vibrations generated by the high speed revolution of the color wheel.

It is noted that the first fixing base 222 and the second fixing base 224 of the supporting chassis 220 need not be opposite each other. Any configuration relationship thereof which can provide the supporting chassis 220 with at least two different fastening directions can be utilized by the subject invention. For example, the first fixing base 222 can also be disposed at an angle between 90 and 180 degrees, with the second fixing base 224 in view of the center 211 of the color wheel 210.

In another preferred embodiment, the above-mentioned configuration of the fixing bases will be disclosed in more detail. The supporting chassis further comprises a third fixing base 226, wherein the connecting device connects the first fixing base 222, the second fixing base 224 and the third fixing base 226 to the frame 300. The first fixing base 222 is disposed opposite to the second fixing base 224 in view of the center 211 of the color wheel 210, while the third fixing base 226 is disposed at an angle from the first fixing base 222 or the second fixing base 224. Any two lines that connect any two from the following—the first, the second, and the third fixing bases 222, 224, 226 and the center 211 of the color wheel 210—form at least one angle between 90 and 180 degrees. That is, the opposite configuration will be formed between any two of the three fixing bases in view of the center of the color wheel so that the stability of the color wheel 210 during a high speed revolution will be enhanced.

Similarly, the third fixing base 226 also comprises a third opening 2261 for receiving the connecting device so that the connecting device can fasten the supporting chassis 220 onto the frame 300 with at least two different fastening directions.

Figure 4:
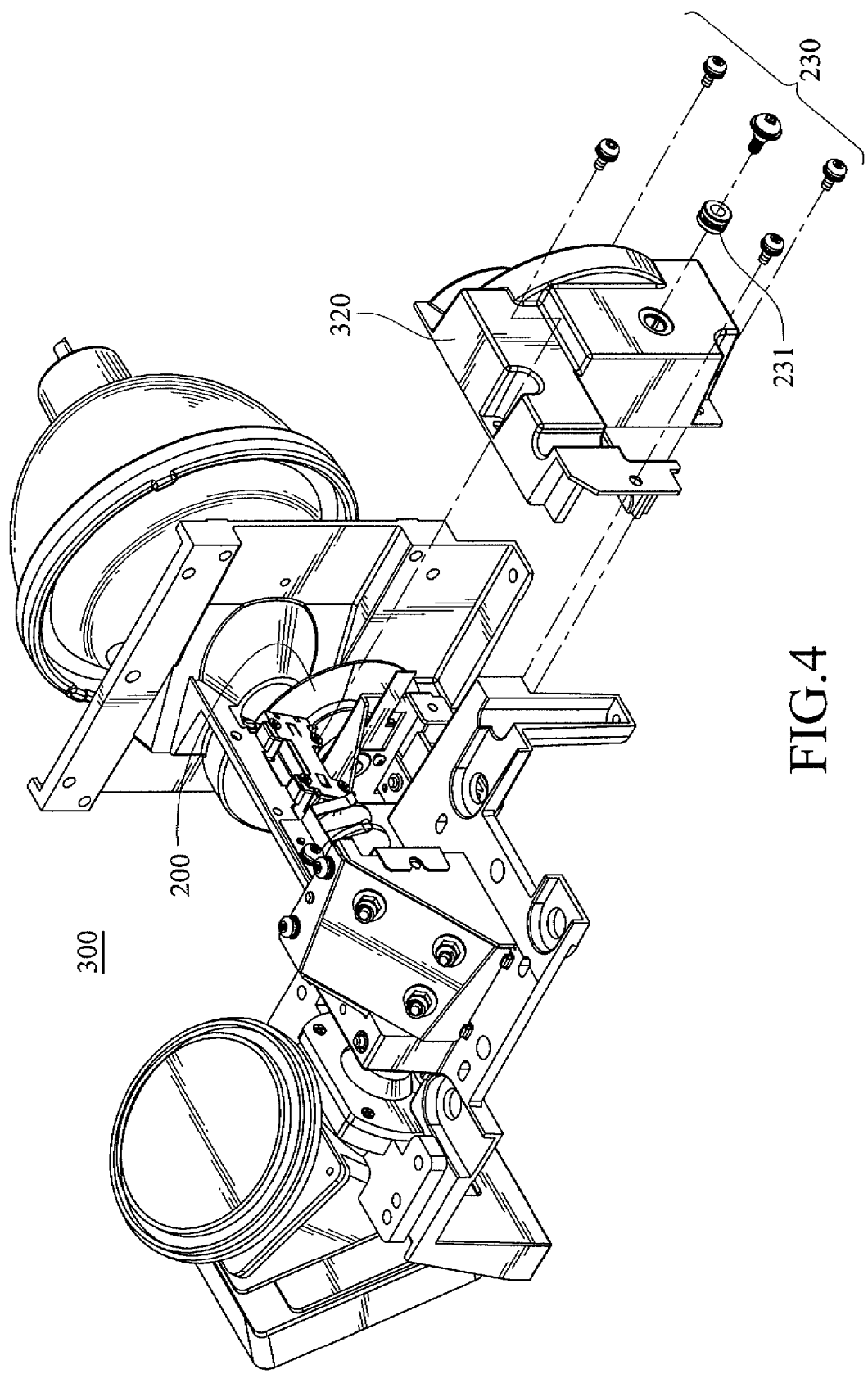
FIG. 4 depicts a schematic drawing of combination a color wheel module in FIG. 2 with a frame.

Referring to FIGS. 2-4, the frame 300 in the optical engine comprises a housing 310 and a cover 320. The first fixing base 222 of the supporting chassis 220 connects to the cover 320 via the connecting device, while the second fixing base 224 and the third fixing base 226 also connect to the housing 310 via the connecting device. In this way, the color wheel module 200 can be configured on the frame 300.

In a preferred embodiment, the connecting device comprises a plurality of screws 230 and a plurality of buffers 231 correspondingly. The screws respectively connect to the cover 320 of the frame 300 via the first opening 2221 of the first fixing base 222 and connect to the housing 310 of the frame 300 via both the second opening 2241 of the second fixing base 224 and the third opening 2261 of the third fixing base 226. The buffers are adapted to provide buffer between the first fixing base 222 and the frame 300, between the second fixing base 224 and the frame 300, and between the third fixing base 226 and the frame 300. Therefore, the stability can be enhanced more as the color wheel rotates with high speed. In a preferred embodiment, the buffers can be any component that buffers and suppresses vibrations, for example, rubber or springs.

The above examples are only intended to illustrate the principle and efficacy of the subject invention, not to limit the subject invention. Any people skilled in this field may proceed with modifications and changes to the above examples without departing from the technical principle and spirit of the subject invention. Therefore, the scope of protection of the subject invention is covered in the following claims as appended.

What is claimed is:

1. A color wheel module for use in an optical engine, the optical engine comprising a frame, the color wheel module comprising:
   a color wheel;
   a connecting device; and
   a supporting chassis, the supporting chassis having a connecting plane, a first fixing base and a second fixing base, the first fixing base and the second fixing base being adjacent to the connecting plane, the color wheel directly connecting to the connecting plane of the supporting chassis, the connecting device connecting the first fixing base and the second fixing base to the frame, wherein the first fixing base has a first fixing surface, the second fixing base has a second fixing surface, the first fixing base is substantially disposed opposite to the second fixing base in view of the center of the color wheel, and the first surface is face to face with and parallel to the second surface.

2. The color wheel module of claim 1, wherein the first fixing base is disposed opposite to the second fixing base in view of the center of the color wheel.

3. The color wheel module of claim 1, wherein the first fixing base is disposed to oppositely deviate from a certain angle with the second fixing base in view of the center of the color wheel.

4. The color wheel module of claim 1, wherein the supporting chassis further comprises a third fixing base, while the connecting device connects the first, the second, and the third fixing bases to the frame.

5. The color wheel module of claim 4, wherein the third fixing base is disposed to oppositely deviate from a certain angle with the first or the second fixing base.

6. The color wheel module of claim 4, wherein two connecting lines between any two of the first, the second, and the third fixing bases and the center of the color wheel form at least one angle of between 90 degrees and 180 degrees therebetween.

7. The color wheel module of claim 1, wherein the frame comprises a housing and a cover, the first fixing base and the second fixing base respectively connect to the cover and the housing.

8. The color wheel module of claim 1, wherein the connecting device further comprises a plurality of screws and a plurality of buffers and the buffers are adapted to provide both buffer between the first fixing base and the frame, and between the second fixing base and the frame when the screws connect the first and the second fixing bases to the frame.

9. An optical engine, comprising:
   a frame; and a color wheel module, configured on the frame, the color wheel module comprising;

a color wheel, having a center;

a connecting device; and a supporting chassis, the supporting chassis having a connecting plane, a first fixing base and a second fixing base, the first fixing base and the second fixing base are adjacent to the connecting plane, the color wheel directly connecting to the connecting plane of the supporting chassis, the connecting device connecting the first fixing base and the second fixing base to the frame, wherein the first fixing base has a first fixing surface, the second fixing base has a second fixing surface, the first fixing base is substantially disposed opposite to the second fixing base in view of the center of the color wheel, and the first surface is face to face with and parallel to the second surface.

10. The optical engine of claim 9, wherein the first fixing base is disposed to the second fixing base in view of the center of the color wheel.

11. The optical engine of claim 9, wherein the first fixing base is disposed to oppositely deviate from a certain angle with the second fixing base in view of the center of the color wheel.

12. The optical engine of claim 9, wherein the supporting chassis further comprises a third fixing base, while the connecting device connects the first, the second, and the third fixing bases to the frame.

13. The optical engine of claim 12, wherein the third fixing base is disposed to oppositely deviate from a certain angle with the first or the second fixing base.

14. The optical engine of claim 12, wherein two connecting lines between any two of the first, the second, and the third fixing bases and the center of the color wheel form at least one angle of between 90 degrees and 180 degrees therebetween.

15. The optical engine of claim 9, wherein the frame comprises a housing and a cover, the first fixing base and the second fixing base respectively connect to the cover and the housing.

16. The optical engine of claim 9, wherein the connecting device further comprises a plurality of screws and a plurality buffers and the buffers are adapted to provide both buffer between the first fixing base and the frame, and between the second fixing base and the frame when the screws connect the first and the second fixing bases to the frame.

* * * * *